(12) United States Patent
Al-Ansary et al.

(10) Patent No.: US 8,435,342 B2
(45) Date of Patent: May 7, 2013

(54) CONCRETE COMPOSITION

(75) Inventors: Marwa Al-Ansary, Doha (QA); Parilakathoottu Aboobacker Sunifar, Doha (QA); Guy Lode Magda Maria Verbist, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 13/515,600

(22) PCT Filed: Dec. 15, 2010

(86) PCT No.: PCT/EP2010/069791
§ 371 (c)(1),
(2), (4) Date: Jul. 9, 2012

(87) PCT Pub. No.: WO2011/073272
PCT Pub. Date: Jun. 23, 2011

(65) Prior Publication Data
US 2012/0272871 A1    Nov. 1, 2012

(30) Foreign Application Priority Data

Dec. 15, 2009  (EP) ..................... 09179193

(51) Int. Cl.
*C04B 28/36* (2006.01)
*C04B 7/36* (2006.01)
*C04B 22/00* (2006.01)
*C04B 40/00* (2006.01)
*B28B 1/00* (2006.01)
*B28B 1/14* (2006.01)

(52) U.S. Cl.
USPC ............................ 106/736; 106/815; 264/333

(58) Field of Classification Search .................. 106/736, 106/815; 264/333
See application file for complete search history.

(56) References Cited

U.S. PATENT DOCUMENTS

| | | | | |
|---|---|---|---|---|
| 4,293,463 A * | 10/1981 | Vroom | ......................... | 524/493 |
| 4,332,912 A * | 6/1982 | Albom | ......................... | 501/140 |
| 4,376,830 A * | 3/1983 | Nimer et al. | ................... | 501/140 |
| 4,376,831 A * | 3/1983 | Woo | ............................... | 501/140 |
| 4,391,969 A * | 7/1983 | McBee et al. | ................. | 528/389 |
| 5,004,799 A * | 4/1991 | Kohls et al. | ................... | 528/389 |
| 6,231,663 B1 * | 5/2001 | Catterton et al. | ............. | 106/705 |
| 8,137,456 B2 * | 3/2012 | Van Trier et al. | ............. | 106/815 |
| 2006/0260514 A1 | 11/2006 | Chang | ........................... | 106/745 |

FOREIGN PATENT DOCUMENTS

| | | |
|---|---|---|
| FR | 2265702 | 4/1975 |
| JP | 2003146713 | 11/2001 |
| WO | WO2007065920 | 6/2007 |
| WO | WO2008148804 | 12/2008 |
| WO | WO2008148814 | 12/2008 |

OTHER PUBLICATIONS

Machine Translation of Japanese Patent Specification No. JP2003-146713 (Nov. 2001).*
Derwent-Acc-No. 2009-H64642, abstract of CN 101407390A (Oct. 2008).*

* cited by examiner

*Primary Examiner* — Anthony J Green
(74) *Attorney, Agent, or Firm* — Charles W. Stewart

(57) ABSTRACT

A concrete composition comprising a mouldable mixture of aggregate, binder and liquid vehicle, wherein the aggregate comprises sulphur concrete-derived aggregate and wherein the binder comprises hydraulic binder. The use of crushed sulphur concrete as aggregate in cement-based concrete reduces the hardening time of the concrete.

5 Claims, No Drawings

CONCRETE COMPOSITION

PRIORITY CLAIM

The present application claims priority from PCT/EP2010/069791, filed 15 Dec. 2010, which claims priority from EP 09179193.9, filed 15 Dec. 2009.

FIELD OF THE INVENTION

The present invention relates to a concrete composition. The invention further relates to a process for the preparation of a shaped concrete article and to a shaped concrete article produced by the process.

BACKGROUND OF THE INVENTION

Articles such as preformed concrete building blocks, roof and floor tiles, paving slabs, structural members, and other articles have traditionally been formed from concrete comprising a mixture of cement, such as hydraulic or Portland cement, mineral aggregate, and water, plus various optional additives such as air entraining agents, water reducers, plasticizers, water proofing and possibly others. These materials may in some instances be combined with reinforcement such as steel bars, wires or fibres. The materials are generally blended in a concrete mixer and the resultant wet mixture is placed and densified in a mould or form to produce a desired shape. Hydration of the cement paste then takes place over a period of time after which the mould or form is removed to form the concrete article. Concrete formed in this manner has reasonable strength and durability in most environments, however the concrete typically takes many days or even weeks to harden to full strength.

Sulphur is readily available in many countries as a by-product of the oil and gas industry. The relatively low cost and unique properties of sulphur have led to its utilization as a construction material particularly to replace the use of Portland cement or asphalt cement. Sulphur concretes have been developed in which elemental or modified sulphur completely replaces the Portland cement.

However, it is important that consideration is given to the sustainability aspects of sulphur concrete, in particular, whether it can be readily recycled.

It has now surprisingly been found by the present inventors that crushed sulphur concrete can be used as aggregate in hydraulic cement-based concretes, particularly those based on Portland cement.

SUMMARY OF THE INVENTION

According to the present invention there is provided a concrete composition comprising a mouldable mixture of aggregate, binder and liquid vehicle, wherein the aggregate comprises sulphur concrete-derived aggregate and wherein the binder comprises hydraulic binder.

According to a further aspect of the present invention there is provided a process for making a shaped concrete article comprising (a) providing a concrete composition having the composition defined herein (b) forming the concrete composition into a shaped article and (c) drying the shaped article to volatilize the liquid vehicle.

The present invention also provides shaped concrete articles produced by such a process. It has surprisingly been found that use of crushed sulphur concrete as aggregate in cement-based concretes leads to a significant reduction in the hardening time of cement-based concrete.

Hence according to another aspect of the present invention there is provided the use of crushed sulphur concrete as aggregate in cement-based concrete.

According to yet another aspect of the present invention there is provided the use of sulphur concrete-derived aggregate for reducing the hardening time of a concrete composition comprising a mouldable mixture of aggregate, binder and liquid vehicle, wherein the aggregrate comprises sulphur concrete-derived aggregate and wherein the binder comprises a hydraulic binder.

It has also been surprisingly found that use of crushed sulphur concrete as aggregate in cement-based concretes leads to decreased water absorption in cement-based concrete. High water absorption can affect the durability of concrete, especially if reinforced. Therefore, reduction of water absorption in cement-based concrete can lead to improvements in durability.

Hence according to another aspect of the present invention there is provided the use of sulphur concrete-derived aggregate for reducing the water absorption of a concrete composition comprising a mouldable mixture of aggregate, binder and liquid vehicle, wherein the aggregrate comprises sulphur concrete-derived aggregate and wherein the binder comprises a hydraulic binder.

DETAILED DESCRIPTION OF THE INVENTION

The term "mouldable" as used herein means compositions which can be formed into a shaped body, for example, by precasting in a mould or extruding, pouring or troweling, at substantially ambient temperatures.

A first essential component of the concrete composition of the present invention is aggregate. The aggregrate used herein comprises sulphur concrete-derived aggregate.

Sulphur concrete-derived aggregate for use herein is obtained by crushing sulphur concrete. Sulphur concrete generally refers to a composite comprising both sulphur cement and aggregate. Sulphur cement generally refers to a product comprising at least sulphur and a filler.

To improve the properties of the sulphur cement, the sulphur may be modified using a sulphur modifier. Such modifiers are known in the art. Examples of such modifiers are aliphatic or aromatic polysulphides or compounds that form polysulphides upon reaction with sulphur. Examples of compounds that form polysulphides are naphthalene or olefinic compounds such as 5-ethylidene-2-norbornene (ENB) or 5-vinyl-2-norbornene (VNB), dicyclopentadiene, limonene or styrene. A preferred sulphur modifier for use herein is a bis(triethoxysilylpropyl) tetrasulphide (TESPT) coupling agent as described in WO2007/065920, WO2008/148804 and WO2008/148814.

Usual sulphur cement fillers are particulate inorganic materials with an average particle size in the range of from 0.1 µm to 0.1 mm. The filler content of sulphur cement may vary widely, but is typically in the range of from 1 to 50 wt %, based on the total weight of the cement.

Typical aggregates for use in sulphur concrete are mineral aggregates. Sulphur concrete comprises coarse aggregate, typically with particles having an average diameter between 5 and 40 mm.

There are no particular limitations on the type of sulphur concrete which can be used herein. Any sulphur concrete which can be crushed to provide sulphur concrete-derived aggregate can be used in the concrete composition herein.

Examples of suitable sulphur concrete for use herein are those described in WO2007/065920, WO2008/148804 and WO2008/148814.

The sulphur concrete-derived aggregate is preferably present in the concrete composition at a level in the range of from 1% to 100%, more preferably in the range of from 10% to 100%, even more preferably in the range of from 50% to 100%, even more preferably in the range of from 70% to 100%, by weight of the total coarse aggregate. The coarse aggregate for use in the concrete composition of the present invention may comprise a mineral-derived aggregate in addition to sulphur concrete-derive aggregate. In a preferred embodiment herein, the coarse aggregate consists of 100% sulphur concrete-derived aggregate. In an alternative embodiment, the sulphur concrete-derived aggregate is used primarily as an additive to reduce water absorption and the coarse aggregate consists of from 5% to 50% sulphur concrete-derived aggregate, by weight of the total coarse aggregate.

The sulphur concrete-derived aggregate is preferably present in the concrete composition at a level in the range of from 40% to 80%, more preferably in the range of from 50% to 70%, even more preferably in the range of from 60% to 70%, by weight of the total aggregate.

The sulphur concrete-derived aggregate is preferably present in the concrete composition at a level in the range of from 30% to 80%, more preferably in the range of from 40% to 70%, even more preferably in the range of from 40% to 60%, by weight of the concrete composition.

The sulphur concrete-derived aggregate preferably comprises particles having an average particle diameter in the range of from 4 mm to 40 mm, more preferably in the range of from 4 mm to 32 mm.

A second essential component of the concrete composition of the present invention is a hydraulic binder. As used herein, the term, "hydraulic binder" refers to an inorganic material which, when mixed with water, forms a paste which sets and hardens owing to a series of reactions and hydration processes and which preserves its strength and its stability, even under water after hardening.

As used herein the term "CEM" stands for "common cement" and refers to hydraulic binders, the hydraulic hardening of which is due mainly due to hydration of calcium silicates. Other chemical compounds such as aluminates participate in this hardening process.

European Standard EN197-1 defines 5 classes of common cement that comprise Portland cement as a main constituent and presents the specifications of 27 cements, known as common cements. The 5 classes of common cement are as follows:

| I | Portland cement | Comprising Portland cement and up to 5% of minor additional constituents |
| II | Portland-composite cement | Portland cement and up to 35% of other single constituents |
| III | Blastfurnace cement | Portland cement and higher percentages of blastfurnace slag |
| IV | Pozzolanic cement | Portland cement and up to 55% of pozzolanic constituents |
| V | Composite cement | Portland cement, blastfurnace slag and pozzolana or fly ash |

Constituents that are permitted in Portland-composite cements are blastfurnace slag, silica fume, natural and industrial pozzolans, silicious and calcareous fly ash, burnt shale and limestone.

Preferred hydraulic binders for use herein are Portland cement, Blast furnace cement, and mixtures thereof. An especially preferred hydraulic binder for use herein is Portland cement.

The hydraulic binder is preferably present in the concrete composition herein at a level in the range of from 5% to 20%, more preferably in the range of from 5% to 15%, even more preferably in the range of from 10% to 15%, by weight of the concrete composition.

A third essential component of the concrete composition of the present invention is a liquid vehicle. Water is conveniently employed as the liquid vehicle and represents the most economic carrier, however, other liquid vehicles that are volatilizable at ambient temperature can also be employed.

The liquid vehicle is present in the concrete composition preferably at a level in the range of from 1% to 15%, more preferably in the range of from 2% to 10%, even more preferably in the range of from 5% to 10%, by weight of the concrete composition.

A preferred component of the concrete composition of the present invention is fine aggregate typically having an average particle diameter of less than 4 mm. A preferred fine aggregate for use herein is normal sand.

The fine aggregate is preferably present at a level in the range of from 20% to 60%, more preferably in the range of 30% to 50%, even more preferably in the range of from 30% to 40%, by weight of the total aggregate.

The concrete composition may comprise additional, optional components such as plasticizers and the like.

The concrete composition of the present invention can be used to make shaped concrete articles. According to one aspect of the present invention there is provided a process for making a shaped concrete article comprising (a) providing a concrete composition as described herein (b) forming into a shaped article and (c) drying the shaped article to volatilize the liquid vehicle. Step (b) is optionally carried out by compacting the concrete composition at an elevated compacting pressure, although it is not mandatory to use an elevated pressure in order to form the shaped article. Preferably, step (c) comprises a drying stage wherein the shaped article is allowed to stand at ambient temperature for a period in the range of from 1 day to 28 days, more preferably in the range of from 1 day to 20 days, even more preferably in the range of from 5 days to 15 days, and especially in the range of from 5 days to 10 days, to allow the liquid vehicle to evaporate from the shaped article.

The concrete composition can also be used for road foundations. When used for road foundations, the concrete composition is typically poured into the ground and compacted by driving heavy machinery over the concrete while still wet.

EXAMPLES

The invention is further illustrated by means of the following non-limiting examples.

Example 1

Preparation of Concrete Samples

The sulphur concrete used in this example contained 17.5% m/m sulphur, 5.8% m/m filler and 76.7% m/m sand and gravel having an average particle size of up to 12 mm.

Coarse aggregates having average particle diameters in the range of from 4 to 32 mm were prepared by crushing flat shaped sulphur concrete blocks having an approximate size of 15×15×7 cm$^3$ (approximately 4 kg) using a Lanphen Svelada stone crusher capable of crushing boulder sized material to a size of less than 31.5 mm, at a feed rate of approximately 1 block/minute to minimise dust cloud. The resulting sulphur concrete aggregates had a density of 2.45 Mg/m$^3$ as measured according to EN 12620 and a water absorption of 1%m/m as measured according to EN 12620.

Fine aggregates having an average particle diameter of less than 4 mm consisted of normal sand. The coarse and fine aggregates were graded as shown in Table 1 below. The aggregates were mixed with Portland cement, water and additives in the mix design as set out in Table 1. The concrete mixture was poured into cube-shaped moulds having dimensions of 150 mm×150 mm×150 mm in order to produce concrete cubes. These concrete cubes were hardened in an alkaline bath at ambient temperature.

TABLE 1

| Component | Grading % of aggregate (m/m) | | Kg/m³ | % m/m |
|---|---|---|---|---|
| Portland Cement (CEM I 32.5) | | | 320 | 13.9 |
| Coarse aggregate: 16-32 mm | Crushed | 27 | 495 | 21.5 |
| Coarse aggregate: 8-16 mm | Sulphur | 20 | 367 | 15.9 |
| Coarse aggregate: 4-8 mm | Concrete | 18 | 327 | 14.2 |
| Fine aggregate (sand): <4 mm | | 35 | 635 | 27.5 |
| Effective mixing water | | | 160 | 6.9 |
| Additives (super plasticiser) | | | 2.025 | 0.1 |

The compressive strength of each concrete cube was measured after 7, 28 and 36 days, according to EN 12390-3. The results are shown in Table 2 below.

TABLE 2

| No. of cubes | Hardening time (days) | Average Compressive Strength (MPa) |
|---|---|---|
| 3 | 7 | 34.6 |
| 4 | 28 | 35.1 |
| 1 | 36 | 34.8 |

After 7 days, the average compressive strength of the concrete cubes did not significantly increase demonstrating that the concrete cubes had reached their full strength after only 7 days. This compares favourably with normal concrete (made with mineral derived aggregate) which typically takes 28 days to harden and reach full strength.

Examples 2 to 4

The sulphur concrete used in Examples 2 to 4 had the same composition as for Example 1 and had a density of 2.45 Mg/m³, an average compressive strength of the 67.8 mPa, an average tensile splitting strength of 4.7 MPa and water absorption of 1% m/m.

The block of sulphur concrete was crushed in order to prepare sulphur-concrete derived aggregates. The resulting crushed sulphur concrete was graded using sieves of various sizes. For each size of sieve the % (m/m) of crushed sulphur concrete remaining on the sieve and the %(m/m) crushed sulphur concrete passing through the sieve were measured. The crushed sulphur concrete used in Examples 2 to 4 has a particle size distribution as shown in Table 3 below.

The crushed sulphur concrete aggregates and/or regular aggregates were mixed with Portland cement and water in the mix design as set out in Table 6. The concrete mixture was poured into cube-shaped moulds having dimensions of 150 mm×150 mm×150 mm in order to produce concrete cubes. These concrete cubes were either "dry" or "wet" cured. "Wet" curing involved curing the concrete cubes in an alkaline bath for one day in the moulds at 20° C. and then after demoulding immersing the concrete cubes in a saturated solution of $Ca(OH)_2$ having a pH of around 12 at 20° C. up to the age of testing strength.

"Dry" curing involved enveloping the concrete cubes in wet towels which were water sprayed once a week and storing in a conditioned storage room (95% R.H., 20° C.) up to the age of testing strength. The necessary water for "dry" curing comes from the cubes own moisture.

Four batches of concrete cubes (150×150×150 mm³) were produced. Each batch differed in mix design and type of curing. Table 4 below shows the four different (mixture and curing) batch variations.

TABLE 4

| Mixture | Type of curing | % replacement of coarse aggregate by crushed sulphur concrete[1] | % replacement of fine aggregate by crushed sulphur concrete |
|---|---|---|---|
| Example 2 | Dry | 100 | 0 |
| Example 3 | Dry | 50 | 0 |
| Example 3 | Wet | 50 | 0 |
| Example 4 | Dry | 50 | 50 |

[1]Coarse aggregates are aggregates larger than 4 mm.

The mix designs of Examples 2, 3 and 4 are shown in Table 5 (expressed as the necessary amounts per 1000 liters)

TABLE 3

| Sieve Size | C40 | C31.5 | C25 | C22.5 | C20 | C16 | C14 | C12.5 | C11.2 | C10 | C8 |
|---|---|---|---|---|---|---|---|---|---|---|---|
| Crushed sulphur concrete remaining on sieve, cumulative % (m/m) | 0 | 2 | 6 | 9 | 14 | 27 | 33 | 40 | 46 | 52 | 62 |
| Crushed sulphur concrete passing through sieve, cumulative % (m/m) | 100 | 98 | 94 | 91 | 86 | 73 | 67 | 60 | 54 | 48 | 38 |

| Sieve Size | C6.3 | C5.6 | C5 | C4 | C2 | C1 | C0.5 | C0.25 | C0.125 | C0.063 | C < 63μ |
|---|---|---|---|---|---|---|---|---|---|---|---|
| Remaining on Sieve, cumulative % (m/m) | 71 | 74 | 76 | 81 | 88 | 92 | 95 | 98 | 99 | 99 | |
| Through sieve, cumulative % (m/m) | 29 | 26 | 24 | 19 | 12 | 8 | 5 | 2 | 1 | 0.7 | 0.7 |

TABLE 5

| Component | Type | Example 2 mass | Example 2 % (m/m) | Example 3 mass | Example 3 % (m/m) | Example 4 mass | Example 4 % (m/m) |
|---|---|---|---|---|---|---|---|
| Cement | ENCI CEM I 42.5 | 320.0 | 13.9 | 320.0 | 13.9 | 320.0 | 13.8 |
| Water | Tap water | 172.8 | 7.5 | 171.1 | 7.4 | 173.7 | 7.5 |
| Sulphur aggregates | Coarse 16-32 mm | 478.5 | 20.7 | 239.3 | 10.4 | 239.3 | 10.3 |
|  | Coarse 8-16 mm | 354.5 | 15.4 | 177.2 | 7.7 | 177.2 | 7.6 |
|  | Coarse 4-8 mm | 319.0 | 13.8 | 159.5 | 6.9 | 159.5 | 6.9 |
|  | Fine 0-4 mm | 0.0 | — | 0.0 | — | 310.2 | 13.4 |
| "Regular" aggregates | Gravel 16-32 mm | 0.0 | — | 239.3 | 10.4 | 258.8 | 11.1 |
|  | Gravel 8-16 mm | 0.0 | — | 177.2 | 7.7 | 185.9 | 8.0 |
|  | Gravel 4-8 mm | 0.0 | — | 159.5 | 6.9 | 166.0 | 7.2 |
|  | Sand 0-4 mm | 660.8 | 28.7 | 660.8 | 28.7 | 330.4 | 14.2 |
| Total |  | 2305.7 |  | 2304.0 |  | 2321.1 |  |

The compressive strength of the concrete cubes of Examples 2, 3 (wet and dry) and 4 was measured after 1, 3, 7, 15, 28, 56 and 91 days, according to EN 12390-3. The results are shown in Table 6. In some cases measurements were taken on more than one cube and therefore the average compressive strengths are shown in Table 6.

TABLE 6

| | Average compressive strength (MPa) | | | | | | |
|---|---|---|---|---|---|---|---|
| Example | 1 day | 3 days | 7 days | 15 days | 28 days | 56 days | 91 days |
| Example 2 (dry) | 9.9 | 21.9 | 32.1 | 35.1 | 33.5 | 33.5 | 32.7 |
| Example 3 (dry) | 9.2 | 24.9 | 35.5 | 40.5 | 42.6 | 42.5 | 43.4 |
| Example 3 (wet) | 8.0 | 21.9 | 30.6 | 37.3 | 38.1 | 39.5 | 39.9 |
| Example 4 (dry) | 7.4 | 19.8 | 26.2 | 24.4 | 24.7 | 30.6 | 32.7 |

As can be seen from Table 6, for each example there is hardly any increase in strength between 15 and 28 days, demonstrating that the concrete cubes had almost reached their full strength in less than 15 days. This compares favourably with normal concrete (made with 100% mineral derived aggregate) which typically takes 28 days to harden and reach full strength.

Examples 5 and 6 and Comparative Example 1

The sulphur-concrete aggregate used in Examples 5 and 6 and in Comparative Example 1 had the same composition as for Example 1.

Sulphur-concrete aggregates were mixed with Portland cement, water and additives in the mix design as set out in Table 7. The concrete mixture was poured into cube-shaped moulds having dimensions of 150 mm×150 mm×150 mm in order to produce concrete cubes. These concrete cubes were hardened in a water bath at ambient temperature (20° C.±2° C.)

TABLE 7

| Component | Type | Comparative Example 1 mass | Comparative Example 1 % (m/m) | Example 5 mass | Example 5 % (m/m) | Example 6 mass | Example 6 % (m/m) |
|---|---|---|---|---|---|---|---|
| Cement | OPC grade 42.5 | 320.0 | 13.0 | 320.0 | 13.3 | 320.0 | 13.7 |
| Water | Tap water | 167.4 | 6.8 | 167.3 | 6.9 | 167.1 | 7.2 |
| Sulphur aggregates | coarse 10-20 mm | 0 | 0 | 142.7 | 5.9 | 342.2 | 14.7 |
|  | Coarse 5-10 mm | 0 | 0 | 107.6 | 4.5 | 258.2 | 11.1 |
| "Regular" aggregates | coarse 10-20 mm | 733.6 | 29.7 | 570.4 | 23.6 | 342.3 | 14.7 |
|  | Coarse 5-10 mm | 554.3 | 22.5 | 431.0 | 17.9 | 258.5 | 11.1 |
|  | Sand 0-5 mm | 693.2 | 28.1 | 673.8 | 27.9 | 646.6 | 27.7 |
| Total |  | 2468.5 |  | 2412.8 |  | 2334.9 |  |

Water absorption of the concrete samples was carried out as per BS 1881 part 122: method for determination of water absorption. The concrete sample was first dried for 24±0.5 h until constant weight. The dry weight of the specimen "Ma" was recorded in kg to the nearest 0.1 decimals. Then the concrete specimen was immersed in water for 30 minutes. The concrete specimen was then removed from water and wiped using a tissue to remove the surface water as rapid as possible and the saturated surface dry weight "Mw" was recorded. The water absorption of the concrete sample "Wa" was calculated as $$Wa=(Ma-Mw)*100/Ma$$

The water absorption values are given in Table 8:

TABLE 8

| | Water absorption after 7 days | Water absorption after 28 days |
|---|---|---|
| Comparative Example 1 | 2.01% | 1.9% |
| Example 5 | 0.13% | 0.13% |
| Example 6 | 0.08% | 0.06% |

Incorporating sulphur-concrete derived aggregate into the concrete samples at 20wt % and 50wt %, based upon the weight of the coarse aggregate, (examples 5 and 6), significantly reduces the water absorption compared to conventional concrete (comparative example 1).

What is claimed is:

1. A process for making a shaped concrete article, wherein the process comprises: (a) providing a concrete composition, a mouldable mixture of aggregate, binder and liquid vehicle, wherein the aggregate comprises sulphur concrete derived aggregate and wherein the binder comprises hydraulic binder; (b) forming the concrete composition into a shaped article, and (c) drying the shaped article to volatilize the liquid vehicle, wherein step (c) for a period in the range of from 1 day to 20.

2. A process according to claim 1, wherein step (c) comprises a drying stage wherein the shaped article is allowed to stand at ambient temperature for a period of 1 day to 15 days to allow the liquid vehicle to evaporate from the shaped article.

3. A shaped concrete article produced according to the process of claim 1.

4. A process for making a shaped concreter article, wherein the process comprises: (a) providing a concrete composition, a mouldable mixture of coarse aggregate, binder and liquid vehicle, wherein the coarse aggregate comprises from 5 to 50% sulphur concrete derived aggregate, by weight of the coarse aggregate, and wherein the binder comprises hydraulic binder; (b) forming the concrete composition into a shaped article, and (c) drying the shaped article to volatilize the liquid vehicle.

5. A shaped concrete article produced according to the process of claim 4.

* * * * *